United States Patent [19]

Bennett et al.

[11] Patent Number: 4,472,143

[45] Date of Patent: Sep. 18, 1984

[54] METHOD FOR SECURING DOORS, AND THE LIKE

[76] Inventors: Harvey G. Bennett; Owen E. Hearold, both of P.O. Box 1065, Minden, Nev. 89423

[21] Appl. No.: 371,113

[22] Filed: Apr. 23, 1982

[51] Int. Cl.³ .............................................. B23P 11/00

[52] U.S. Cl. .......................................... 29/434; 70/89; 70/91; 70/93; 70/136; 70/144; 292/264; 292/DIG. 30

[58] Field of Search ....... 292/262, 264, 278, DIG. 30, 292/DIG. 46, DIG. 64; 70/89, 91, 136, 144, 93; 29/434

[56] References Cited

U.S. PATENT DOCUMENTS

| | | | |
|---|---|---|---|
| 464,079 | 12/1891 | Painter | 292/264 |
| 864,559 | 8/1907 | Rinald | 292/264 |
| 878,607 | 2/1908 | Cairns | 292/264 |
| 880,214 | 2/1908 | Hennings | 292/264 |
| 1,867,694 | 7/1932 | Cramer | 292/264 X |
| 1,924,627 | 8/1933 | Segal | 292/264 X |
| 2,075,015 | 3/1937 | Beaumont | 292/264 X |
| 2,113,104 | 4/1938 | Beaumont | 292/264 X |
| 2,724,257 | 11/1955 | Segal | 292/264 X |
| 2,790,663 | 4/1957 | Sarver | 292/264 |
| 2,966,053 | 12/1960 | Mintz | 292/264 |
| 2,970,465 | 2/1961 | Falk, Jr. et al. | 70/93 |
| 2,981,090 | 4/1961 | Patriguin et al. | 70/93 |
| 3,039,289 | 6/1962 | Mintz | 70/93 |
| 3,738,694 | 6/1973 | Banse | 292/264 |
| 3,965,564 | 6/1976 | Slovensky, Jr. | 29/434 |
| 4,054,310 | 10/1977 | Coopersmith | 70/93 X |
| 4,155,577 | 5/1979 | Raymond | 292/264 |
| 4,179,789 | 12/1979 | Lipschultz | 29/434 X |
| 4,254,975 | 3/1981 | Miller | 292/264 |
| 4,258,463 | 3/1981 | Lindquist | 29/434 |

FOREIGN PATENT DOCUMENTS

| | | | |
|---|---|---|---|
| 145535 | 1/1903 | Fed. Rep. of Germany | 70/93 |
| 255772 | 7/1926 | United Kingdom | 292/264 |
| 1155157 | 6/1969 | United Kingdom | 292/264 |

*Primary Examiner*—Charlie T. Moon
*Assistant Examiner*—Ronald S. Wallace
*Attorney, Agent, or Firm*—Herbert C. Schulze

[57] ABSTRACT

This invention is a unique method and apparatus for securing doors, windows, and the like, from unwarranted entry so that limited opening of the door, or the like, can be accomplished. The invention further provides for the emergency release of the securement device by a person from the inside of the locked room. Methods and apparatus for adapting and installing the securement device is unique and the unwarranted entry is further accomplished by means of unique design for preventing jarring or vibrating the securement device out of position of proper operation. Additional features include the allowing of entry into the room from the outside authorized persons by means of undetectable access features.

3 Claims, 14 Drawing Figures

METHOD FOR SECURING DOORS, AND THE LIKE

CROSS-REFERENCE TO RELATED PATENT APPLICATIONS

There are no patent applications filed by us relating to this application other than a Design Application entitled LOCKING DEVICE which is being filed concurrently with this application.

BACKGROUND OF THE INVENTION

1. Field of the Invention

This invention is in the general field of locking devices, particularly locking devices which are installed for the purpose of prohibiting unlawful and unwarranted entry into a room, and the like. The invention is further directed to the safe and easy unlocking should a person within the area that is protected by this invention has to exit the area in the case of an emergency. The invention is also provided with a feature of being able to let an authorized person into the protected area by means of a unique entry feature.

2. Description of the Prior Art

There have been numerous attempts for providing a safety locking device for the purpose of preventing unlawful and unwarranted entry into rooms, and the like, by persons that are undesirable for entry. Many chain door guard implements are currently on the market available to the general public and have been provided for many years to people wishing to have an additional lock on their door or window other than the conventional locking devices such as locksets, and the like. None of the previous and present devices, however, provide the secure and regulated opening of the door or window to a limited extent. The conversion of existing devices from old methods to the one devised by our device has not been easily or correctly accomplished. In all of these respects, the present invention is completely unique.

SUMMARY OF THE INVENTION

We have been engaged in a study of securing device, and particularly in the problems of safety securing devices which, in effect, provide limited opening of doors and windows to a room without allowing the entry into the room of unwarranted personnel.

We have also been concerned about the nessecity of allowing a person within the secured room to be able to exit from the room in case of an emergency in the least amount of time available.

The most common method of providing such a securement device as is practiced in today's method is one that is commonly known as a "chain door guard". This consists of an anchored chain having a pin attached to its loose end that usually has an enlarged portion that fits into a bayonet-type slotted channel, or the like. The problem with such an installation has many times occured wherein the person within the room has attempted to quickly unlatch the pin sliding within the channel and is unable to do so in a rapid manner.

Vibration on such a mechanism has also often resulted in the chain loose from its channel allowing the unauthorized person to enter the room.

We have now conceived and developed a securing device which eliminates the problems mentioned above and have done so in such a manner so as to be easily installed on most door and window structures, and is economical to purchase.

We have also provided a simple conversion kit that can readily encompass existing securement devices and yet provide the safety features previously mentioned.

Thus, it is an object of this invention to provide a method for securing a door or window from outside entry to unwarranted persons.

It is another object of this invention to provide such a structured device that can easily be installed and simply adjusted for proper operation.

Another object of this invention is to provide a device that is free from being jarred or shaken out of operation.

A further object of this invention is to allow a person within the room to exit rapidly and efficiently in the fastest time possible.

Finally, we have provided a unique method of being able to actuate the securing device from the outside of the room when it becomes necessary to enter the room bypassing the securement assembly while the assembly is in a securing position.

The foregoing and other objects and advantages of this invention will become apparent to those skilled in the art upon reading the description of a preferred embodiment which follows in conjunction with a review of the appended drawings.

DESCRIPTION OF A PREFERRED EMBODIMENT

Figure 1:
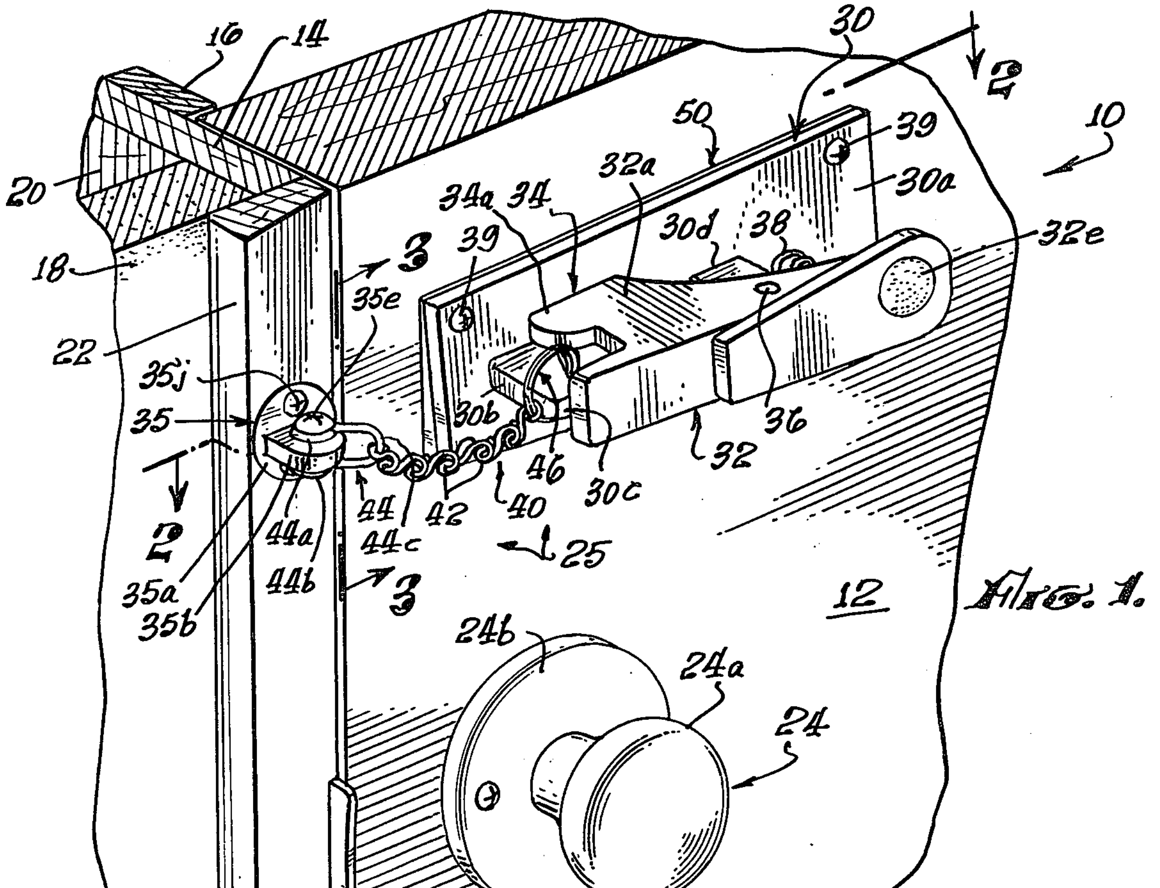
FIG. 1 is a fragmentary perspective, partly in section, of a typical installation of the method and apparatus for securing doors and windows against unwarranted entry.

FIG. 1 is a perspective view, partly in section, of an assembly 10, which constitutes components that work together in order to practice the method of our invention for the securement of doors and windows from unwarranted entry. The door 12 is shown operating in a doorway, or window opening, cooperatively with a jamb 14 which is provided with a stop strip 16.

Wall 18 is illustrated as affixed to a stud 20, or the like, as is familiar to those in the building structure art. The conventional type of door lock and handle 24 is shown with the knob 24*a*, the rosette 24*b*, and the striker plate 24*c* complete the typical door components.

The securement assembly 25 is comprised of a flexible connector retainer mechanism 30 which cooperates with a flexible connector anchor means 35. The retainer mechanism 30 is primarily a latch-type arrangement for keeping the flexible connector 40, such as a link chain of small segments 42 and its associated connector elements 44 and 46 in a condition for preventing unwarranted opening of a door or window by an outside intruder to such an extent that the intruder can come into the room or one that can somehow unlatch the chain, or flexible connector, so that the entry can be completed.

The connector element 44 is shown to be a U-shaped swivelled stirrup which is pivotally mounted on the member 35, while the opposite connector element 46 is shown to be a split-ring arrangement such as is used in the grouping of keys at the end of a chain. We have found through lengthy experimentation and trial that the arrangement as we have presented in the illustrations has proved to be very effective into being able to adapt the chain connector to length adjustments.

Figure 12:
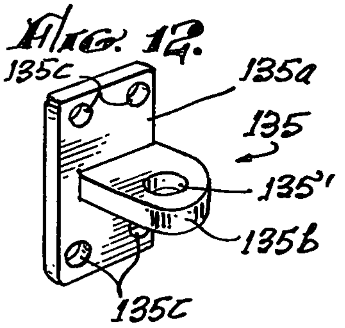
FIG. 12 is a perspective of another design of chain anchoring bracket.

Whenever more than one placement of flexible retaining and anchoring device is desired, the projecting ear element of such an anchor can be offset as seen in a later-to-be described FIG. 12. It is easily understood that when the anchor means is turned upside down from the placement first attempted, that the distance from the anchoring element to the retaining assembly at the opposite end of the connecting chain member is changed.

As shown in FIGS. 1, 2, 3 and 5 the anchoring member 44 is constructed of a pair of eyelets 44*a* and 44*b* which are interconnected by a U-shaped chain link receiving portion 44*c*. The anchoring member 35 is shown constructed of a base plate portion 35*a* having an ear 35*b* projecting outwardly therefrom. Openings 35*c* provide the fastening of the base plate to the molding 22 within its corresponding recess 22*a*.

The stirrup portion 44*c* is free to rotate about an axis 35*d* which serves to direct the chain connection into position to align itself toward the direction of pull should the door 12 be moved away from the stop strip 16.

The other connector member 46 is displayed in the drawings as a ring which is spirally wound into a circular configuration and has an offset portion 46*a* interconnecting the two segments 46*b* and 46*c* to allow the loop to be placed onto one of the links 42 by spreading the segments 46*b* and 46*c* apart from one another while being connected by the central connecting point 46*a*. Additional links are easily added or even taken away in order to adjust the length of the completed chain 40 to accomodate the amount of desired space that the door can open for the person being protected by the security device to be able to look out at who is at the door and still enough limitation to prevent unwarranted entry.

Basically, the security device which retains the ring 46 is manufactured with a base portion 30*a*. A projection 30*b* in the form of an upstanding lug serves as a post for the ring 46. When the ring is placed over the outside end 30*c* of the post 30*b*, an extension of a pivoted latch 32 keeps the ring from slipping off the post.

The latch 32 has a split extension 34 which has ears 34*a* and 34*b* straddling the post 30*b* at the end nearest the base portion 30*a*.

A second projection from the base portion 30*a* is shown at 30*d*. This second projection has an opening formed therein at 30*e* for the passing through of a pivot pin 36. The pivot pin 36 is inserted through wall portions 32*a* and 32*b* at the openings 32*c* and 32*d* provided therein. It can be observed that when the latch 32 is pressed at one end 32*e* by a person's hand the bifurcated split ends 34*a* and 34*b* move away from the base plate and allow the ring 46 to be pushed off the post 30*b* past the end 30*c* and allows the door to be opened for entry. The handle portion 32 has an extension 32*f* which rests upon the end 30*c* of the post 30*b* and retains the ring 46 about the post from slipping off. A fluorescent disc, or the like, can be placed at the end of the handle at the point 32*e* for easy location in the dark should the person wish to quickly exit from the room in an emergency.

Figure 6:
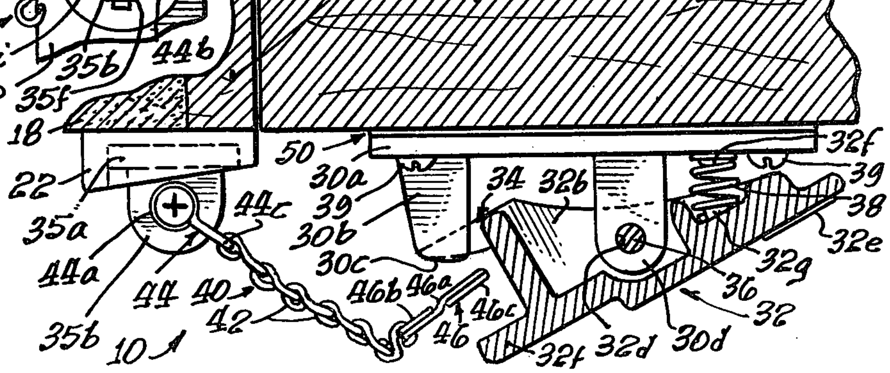
FIG. 6 is a sectional view, on an enlarged scale similar to FIG. 2, but with certain portions in section, and showing the securing device of FIG. 1 being released from within the room.

A biasing means, such as a coil spring 38 is shown to be retained by projections 30*f* on the base 30*a* and at 32*g* on the underside of the handle 32. This spring keeps the extension 32*f* constantly in contact with the end 30*c* of the post 30*b*. When the handle 32 is rotated as shown in FIG. 6, the ring is then lifted off the post 30*b* and the door or window can be opened to a more fully open condition.

Screws 39 are shown to be insertable through the openings 30*h* to secure the base to the door or window.

Figure 3:
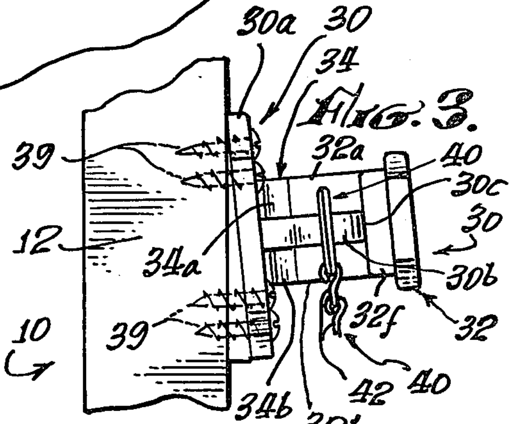
FIG. 3 is a fragmentary end elevation of the securing device of FIG. 1, as it is viewed along line 3—3 of FIG. 1.
Figure 2:
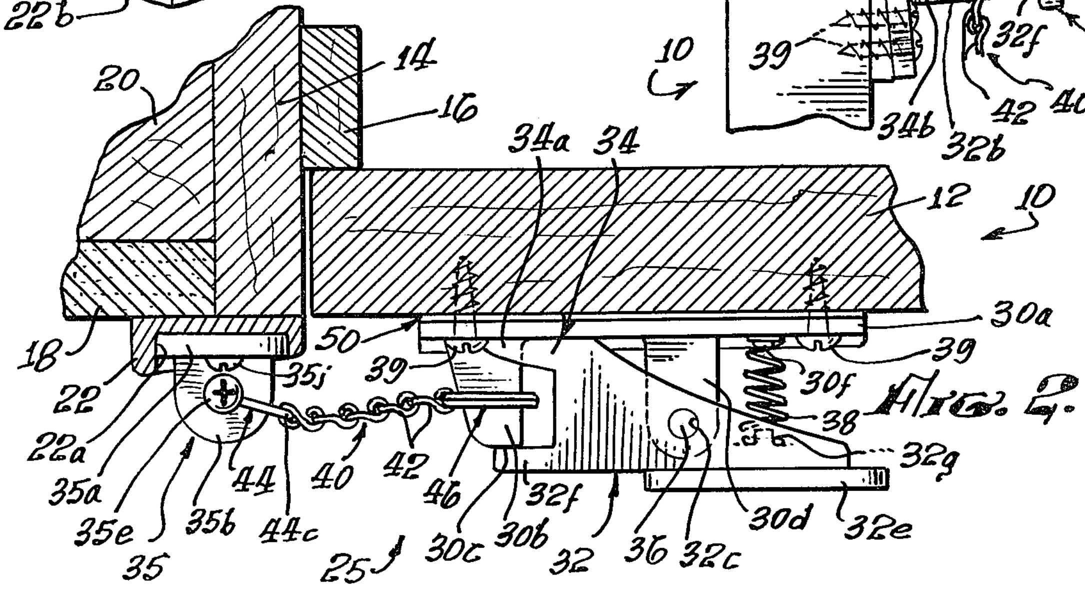
FIG. 2 is a partial section, with certain parts in elevation, on an enlarged scale as viewed along line 2—2 of FIG. 1.
Figure 4:
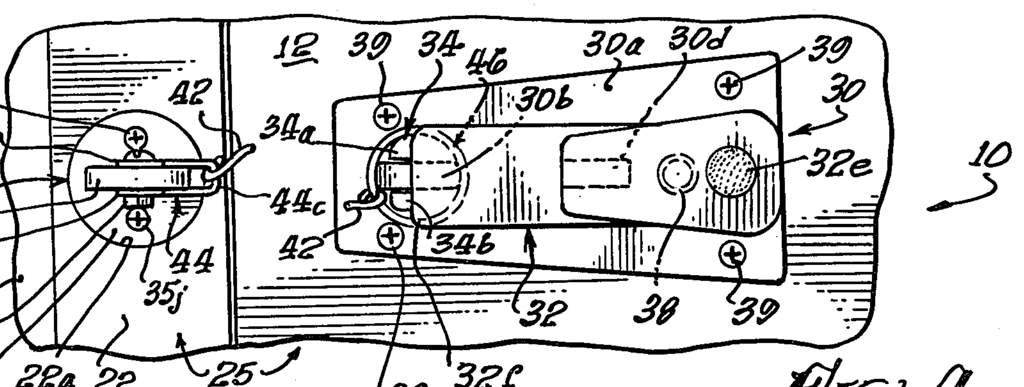
FIG. 4 is a frontal plane view in elevation of the device of FIG. 1.
Figure 5:
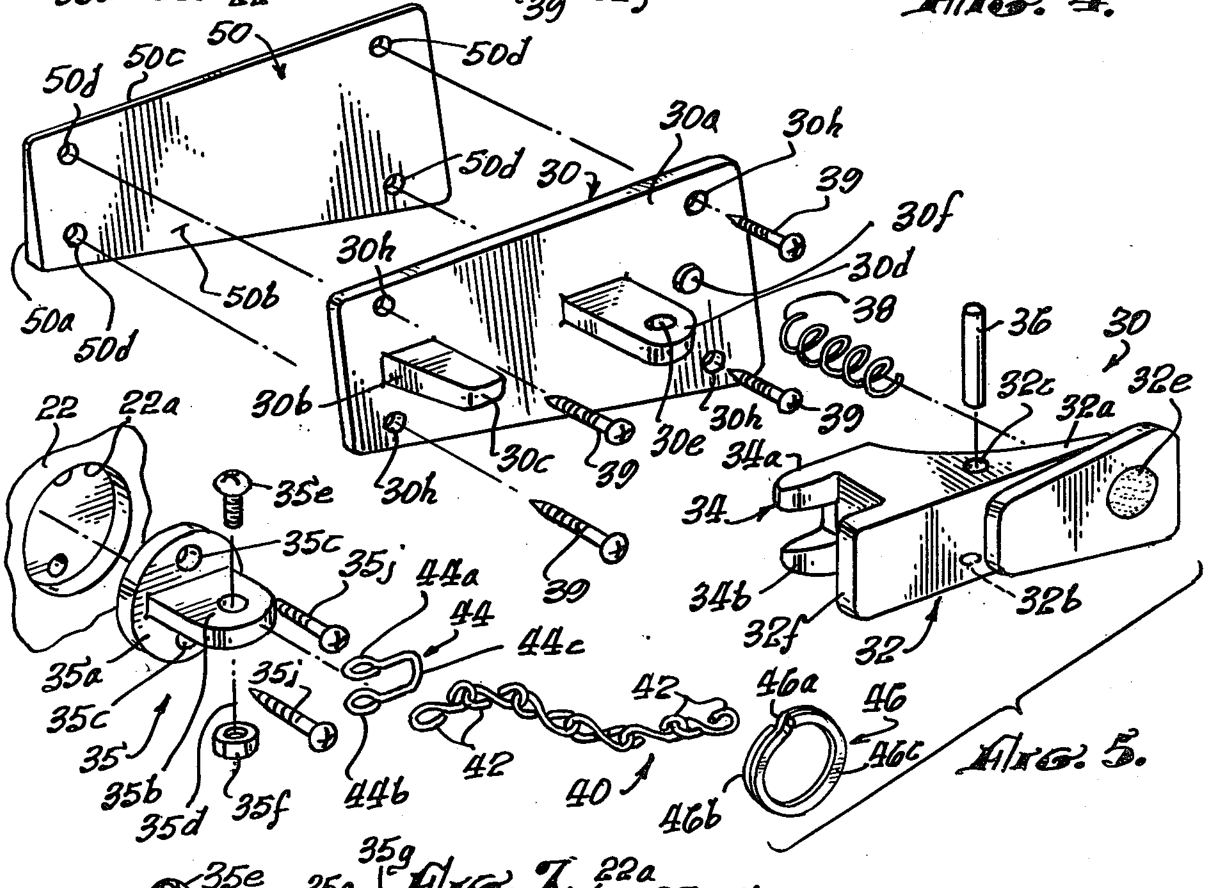
FIG. 5 is an exploded perspective of the elements comprising the security device of FIG. 1.

Another feature of our invention is the addition of a wedge-like spacer element 50. This spacer is shown in FIG. 3 and tilts the base 30 slightly upwardly in order to keep the ring from crawling outwardly toward the face 30*c*. The spacer has surfaces 50*a* and 50*b* that converge to a point 50*c*. Openings 50*d* are provided for passage of the screws 39.

The anchoring assembly 35 includes a pivot screw 35*e* and fastening nut 35*f* which complete the securement of the stirrup member 44 in a rotating mode.

Figure 7:
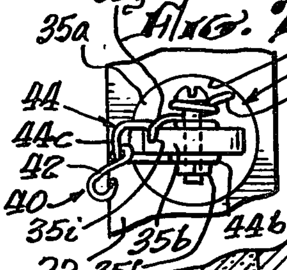
FIG. 7 is a fragmentary frontal plane view of the chain attached portion of the security device of FIGS. 1 through 6, but with an alternate embodiment incorporating the urging of the chain and swivel into a condition for keeping the chain out of the way of moving parts.
Figure 8:
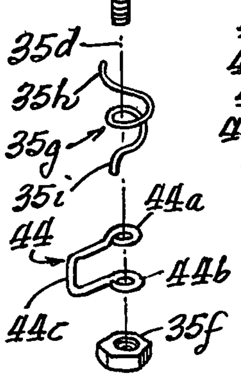
FIG. 8 is an exploded view of some of the components illustrated in FIG. 7.

In FIGS. 7 and 8 we have shown a spring 35*g* with ends 35*h* and 35. When installed as shown in the plan view of FIG. 7, it can be seen that the stirrup member 44 will be constantly urged into a position in order to keep the chain 40 from being caught between the door and the frame when the door is in the process of being opened or closed during the attempt at entry or when the occupant decides to open the door for limited access. Screws 35*j* are shown in the figures that can be used to secure the anchor assembly 35 to the strip 22.

Figure 9:
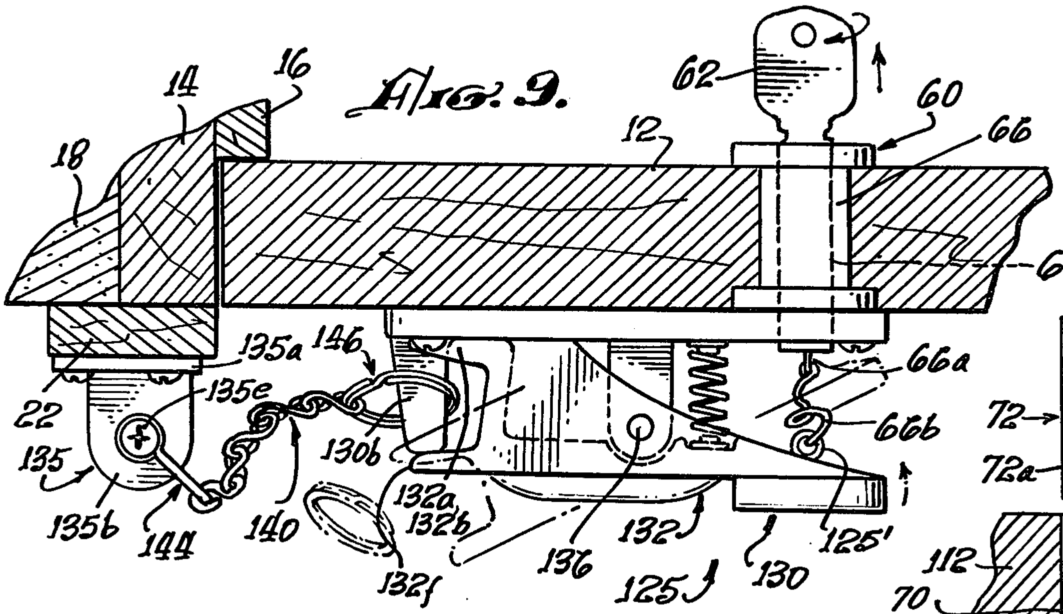
FIG. 9 is an enlarged sectional view, partly in elevation, of an alternate embodiment of security device for securing doors and windows from unwarranted entry.

In FIG. 9 we have shown an alternate embodiment of securing assembly 125. In this case, the unit placed on the door at 130 cooperates with the anchoring assembly 135 and is connected by flexible element 140 to stirrup 144 and ring 146.

The anchoring means 135*b* is shown as a rectangular base 135*a* with a projecting ear 135*b* and openings 135*c* as was basically described in the preferred embodiment earlier in this application. However, it is to be noted that the ear is shown offset to one side of the base portion for the purpose of being able to be either closer or farther away from the assembly 130 depending upon whether the base is mounted right side up or upside down. This unique form of prepared adjustability allows the usually difficult method of adjustment very simple. The opening 135' is shown to be formed in the ear in order to allow the passing of the pivot member 135*e* therethrough.

Figure 10:
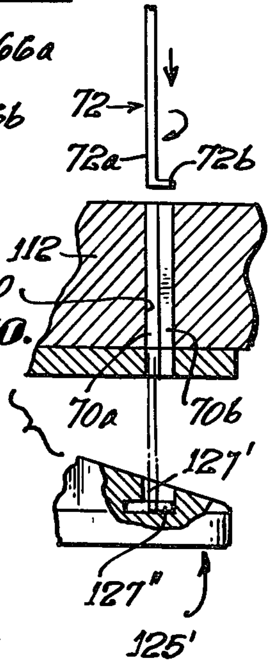
FIG. 10 is a sectional view, with certain parts in elevation; of an alternate method of actuating the handle portion of the devices of FIGS. 1 and 9.
Figure 11:
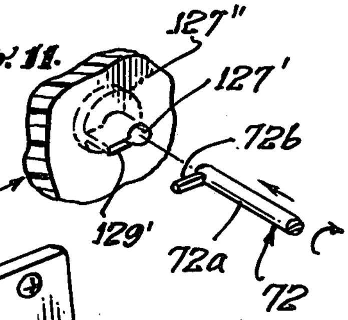
FIG. 11 is an exploded perspective, partly in section, of certain of the elements of FIG. 10.

One of the additional features of the form shown in FIG. 9 and the views offered in FIGS. 10 and 11 is the provision of allowing a person to enter the room from the outside. It is often necessary to gain access to the secured room by a person for instances of emergencies, and the like. We have shown a tumbler-type lockset at 60 which has a key insertable into the rotating tumbler 64. When this key is inserted by a person, the tumbler is capable of being withdrawn from the receiving insert 66. A connecting element 66*a* is shown with a flexible line 66*b*. This line is affixed to a connection point 125' on the assembly 125 and when it is desired, the withdrawel of the member 66 allows the person to move the handle portion 130 pivotally about a pin 136 to allow the end 132*f* to be moved away from the post 130*b* and allow the bifurcated portions 134*a* and 134*b* to move the ring 146 off the pose 130*b*.

The FIGS. 10 and 11 show another method of allowing a peson to release the latching securement assembly to allow entry from the outside of the secured room. In this instance, an opening 70 is provided in the door 112 for the allowance of entry of a special tool 72. The tool 72 has a shank 72*a* and an offset portion at 72*b*. When this tool is inserted through the opening 70 into a circular hole 70*a* and in alignment with slot 70*b*, and passing the tool through the door, an operator can move the tool toward a handle 125'. A correspondingly shaped opening 127' is shown in the handle along with a key slot 129'. The tool, when passed into enlarged circular opening 127'' can then be rotated into position to allow the operator to pull back on the tool and at the same time move the handle into an unlatching condition.

Figure 13:
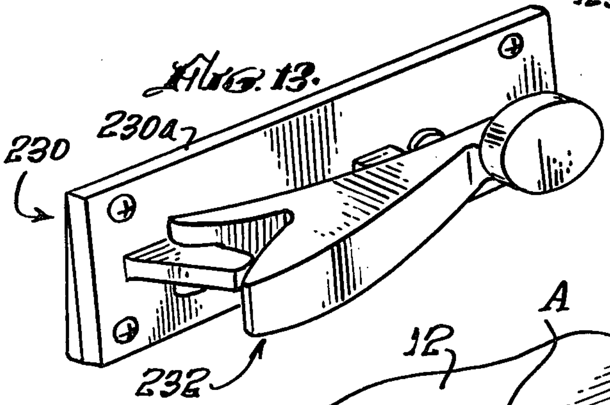
FIG. 13 is a perspective view of yet another embodiment of securement device.

FIG. 13 merely shows that various configurations can be employed into the latching mechansim. In this figure we have shown the assembly 230 with the base 230*a* cooperating with a handle assembly 232 to secure a chain and ring latching means as shown in previous figures. The handle, in this instance, is shown to be configured into a smooth rounded shape and the pressure handle portion is a cylindrical shape.

Figure 14:
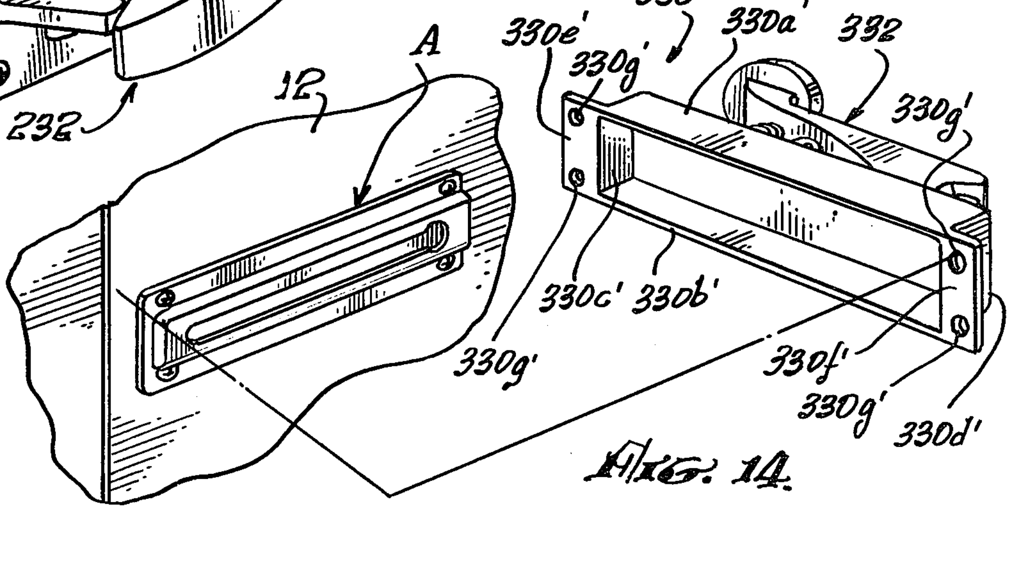
FIG. 14 is a perspective view of an adaptor-like security device to be used to provide a security device for securing doors and windows against unwarranted entry which can be placed over conventional existing chain door guard hardware which is already in place.

In FIG. 14 we have provided an assembly comprising a base portion 330 and handle portion 332 which are adaptable to be placed over a conventional chain door guard bracket A. The base portion 330*a* is formed into a rectangular box-like shape with walls 330*a'*, 330*b'*, 330*c'* and 330*d'*. Extensions 330*e'* and 330*f'* are shown to accomodate openings 330*g'* for the passage of securing screws (not shown) to the door. Thus, it is shown that one can easily place the device of our invention directly over an existing chain door guard without even having to remove the existing guard. The anchoring device can be similar to the ones shown earlier in this application with the usual anchoring post, connecting flexible chain and the ring loop.

It is to be understood that the materials that can be effectively used in the construction are easily obtainable in the marketplace and that the materials used can be of various metals, and the like, that would fit the need of the person installing the assembly in the door or window assemblies that are present.

The type of chain, or flexible connector, can range from cables to chain links.

The anchoring means for the chains, and the like, can be those used conventionally, although the forms shown in our application are preferred. The split ring and the interchangable brackets allow for easy adjustments that may necessary to suit a particular type of door or window.

While the embodiments of this invention shown and described are fully capable of achieving the objects and advantages desired, it is to be understood that such embodiments are for the sole purpose of illustration and not for the purpose of limitation.

We claim:

1. The method of securing doors and windows from intrusion and unwarranted entry comprising the steps of:

(1) permanently anchoring one end of a flexible securement member to a position on a frame of a door or window opening;

(2) providing a circular loop member at the other end of said flexible securement member;

(3) permanently attaching, openable and closeable loop member retainment means on a door or window and adjacent to said anchoring position;

(4) activating a pivotal handle means on said releasable loop member retainment means to open same for receiving said loop member;

(5) placing said loop member in retainment by encircling said releasable loop member retainment means with said loop member;

(6) deactivating said pivotal handle means thus closing said releasable loop member retainment means and retaining said loop member on said releasable loop member retainment means; and (7) releasing said loop member from retainment by a second activation of said pivotal handle which activates a loop lifting means and which opens said retainment means for removing said loop member therefrom, which activation is from the inside of the area that is desired to be protected from unwarranted entry.

2. The method as set forth in claim 1 wherein the second handle activation lifts said circular loop member by a forked lifting member.

3. The method as set forth in claim 2 wherein secondary means is provided for releasing said loop member by actuation of said handle forked lifting member from outside the area being protected.

* * * * *